United States Patent
Balster et al.

(10) Patent No.: US 9,976,598 B2
(45) Date of Patent: May 22, 2018

(54) ROLLER BEARING REPLACEMENT DEVICE AND PROCESS FOR REPLACING ROLLER BEARINGS

(71) Applicant: LOI Thermprocess GmbH, Essen (DE)

(72) Inventors: Frank Balster, Nottuln (DE); Horst Wachholder, Essen (DE)

(73) Assignee: LOI Thermprocess GmbH, Essen (DE)

( * ) Notice: Subject to any disclaimer, the term of this patent is extended or adjusted under 35 U.S.C. 154(b) by 229 days.

(21) Appl. No.: 15/000,664

(22) Filed: Jan. 19, 2016

(65) Prior Publication Data

US 2016/0208860 A1    Jul. 21, 2016

(30) Foreign Application Priority Data

Jan. 20, 2015   (EP) .................................. 15151782
Jan. 21, 2015   (EP) .................................. 15151976
(Continued)

(51) Int. Cl.
*F16C 35/06*  (2006.01)
*F16C 19/54*  (2006.01)
(Continued)

(52) U.S. Cl.
CPC ............ *F16C 35/062* (2013.01); *F16C 19/54* (2013.01); *F27B 3/10* (2013.01); *F27B 9/2407* (2013.01);
(Continued)

(58) Field of Classification Search
CPC ...... F27B 9/2407–9/2423; F27B 9/2469; F27B 9/30; F27B 9/047; F27B 3/10; F27B 3/24;
(Continued)

(56) References Cited

U.S. PATENT DOCUMENTS

| | | | |
|---|---|---|---|
| 5,819,354 | A | 10/1998 | Alonso et al. |
| 2011/0185793 | A1 | 8/2011 | Harrison |

(Continued)

FOREIGN PATENT DOCUMENTS

| | | |
|---|---|---|
| CN | 200941005 | 8/2007 |
| DE | 3816503 | 2/1989 |

(Continued)

OTHER PUBLICATIONS

Search Report of EP 15152140.8 dated Jun. 8, 2016, 3 pages.
(Continued)

*Primary Examiner* — Jun Yoo
(74) *Attorney, Agent, or Firm* — Rankin, Hill & Clark LLP (57) ABSTRACT

A roller bearing replacement device with a housing that is sealed off is provided that has a sluice which can be coupled on a roller hearth furnace through which access to a roller bearing of the roller hearth furnace that is to be demounted is possible, and at least one roller bearing handling device which is arranged in a moveable manner inside the housing and can at least partly be moved out of the housing through the sluice. The housing has a cooling chamber designed for cooling of demounted roller bearings in which the at least one roller bearing handling device is constructed so that it can be moved at least between a replacement position and a cooling position.

13 Claims, 4 Drawing Sheets

| (30) | Foreign Application Priority Data | |
|---|---|---|
| Jan. 22, 2015 | (EP) | 15152140 |
| Jan. 30, 2015 | (EP) | 15153283 |
| Feb. 3, 2015 | (EP) | 15153620 |

(51) Int. Cl.
*F27B 3/10* (2006.01)
*F27B 9/24* (2006.01)
*F27B 9/30* (2006.01)
*F27D 9/00* (2006.01)

(52) U.S. Cl.
CPC ........ *F27B 9/30* (2013.01); *F27D 2009/0021* (2013.01)

(58) Field of Classification Search
CPC .... F27B 3/00; F27B 17/0016; F27B 17/0083; F27B 2017/0091; F16C 35/062; F16C 19/54; F16C 37/00; F16C 37/007; F27D 3/0026–3/0028; F27D 25/00; F27D 9/00; C03B 35/16; C21D 9/0012; C21D 9/0056; C21D 9/563
See application file for complete search history.

(56) References Cited

U.S. PATENT DOCUMENTS

| | | | | |
|---|---|---|---|---|
| 2014/0165404 A1* | 6/2014 | Ebner | ................. | C21D 9/0012 29/895.1 |
| 2016/0208858 A1* | 7/2016 | Balster | .................... | C03B 35/16 |
| 2016/0208859 A1* | 7/2016 | Balster | ................. | F16C 35/062 |
| 2016/0208861 A1* | 7/2016 | Balster | ................. | F16C 35/062 |

FOREIGN PATENT DOCUMENTS

| | | |
|---|---|---|
| DE | 3735949 | 5/1989 |
| DE | 10 2007 004158 | 7/2008 |
| DE | 102008012739 | 9/2009 |
| DE | 102011079771 | 1/2013 |
| EP | 0033845 | 8/1981 |
| EP | 1069389 | 1/2001 |
| FR | 2742854 | 6/1997 |
| FR | 2966553 | 4/2012 |
| GB | 2 220 732 | 1/1990 |
| JP | H0587460 | 4/1993 |
| JP | 2003156287 | 5/2003 |
| KR | 20030053400 | 6/2003 |
| WO | 2013152419 | 10/2013 |

OTHER PUBLICATIONS

Search Report of EP 15151976.6 dated Jun. 8, 2016, 3 pages.
Search Report of EP 15153283.5 dated Jun. 10, 2016, 3 pages.
Search Report of EP 15153620.8 dated Jun. 14, 2016, 3 pages.
Austrian Search Report dated Aug. 5, 2015.
European Search Report filed in EP 15151782 dated Aug. 6, 2015.

* cited by examiner

ROLLER BEARING REPLACEMENT DEVICE AND PROCESS FOR REPLACING ROLLER BEARINGS

BACKGROUND

The invention relates to a roller bearing replacement device for replacement or exchange of a roller bearing of a roller hearth furnace comprising: a housing that is sealed off from the external atmosphere, which has a sluice that can be coupled on the roller hearth furnace through which access to a roller bearing that is to be demounted is possible from the inside of the housing while excluding the external atmosphere, and at least one roller bearing handling device that is arranged moveably in the housing and is designed so it can be moved out at least partly through the sluice.

Furthermore the invention relates to a process for replacement or exchange of roller bearings of a roller hearth furnace by means of a roller bearing replacement device, in which the roller bearing replacement device is moved laterally near the roller hearth furnace to the position of the roller bearing that is to be replaced, the roller bearing is decoupled from a drive unit and then the roller bearing replacement device is moved towards the roller hearth furnace to the roller bearing that is to be demounted, in which a sluice of the roller bearing replacement device is coupled in a gas-tight manner on the roller bearing furnace, and in which then the roller bearing that is to be demounted is moved by a roller bearing handling device that is arranged in a moveable manner in the housing.

A roller bearing replacement device of the type identified at the start is for example known from the patent DE 10 2011 079 771 A1, in which from this application a process for roller bearing replacement according to the type identified at the start is also to be taken. This known roller bearing replacement device is moveable laterally near the roller hearth furnace and has an enclosed carrier roller bearing handling device, i.e. a roller bearing handling device housed in a housing of the roller bearing replacement device. For roller bearing exchange or replacement, the roller bearing replacement device is moved alongside the longitudinal axis of the furnace and positioned at the appropriate exchange position. Then a sluice of the roller bearing replacement device is screwed on in a gas-tight manner to the roller bearing replacement device, so that a gas-tight insulation exists between the inside of the housing of the roller bearing replacement device and the environment. In case of a roller bearing replacement, a lance of the roller bearing handling device travels into the hollow roller bearing in order to lift the roller bearing that is to be replaced and to pull the roller bearing out of an opening that is designed and constructed in the wall of the roller hearth furnace, in which the roller bearing is placed in a rotatable manner while in operation. The roller bearing that is demounted is then deposited in a shelf or rack inside the housing according to this known state of the art. The patent DE 10 2011 079 771 A1 provides for several racks or shelves or similar, which offer place for the accommodation of a corresponding number of defective or demounted roller bearings.

The following is disadvantageous in this known state of the art: after the demounting of a roller bearing through the opening via the sluice of the housing, the furnace atmosphere with a temperature of 1000° C. for example penetrates into the inside of the housing and causes a significant increase in the temperature of the housing atmosphere i.e. the atmosphere within the roller bearing replacement device, which has a destructive effect on the electronic components installed inside and on the roller bearing replacement device. Moreover the hot roller bearing that has been demounted from the roller hearth furnace radiates heat powerfully, and this likewise increases the temperature inside the housing considerably.

SUMMARY

The invention aims at finding a solution that makes available a roller bearing replacement device in a simple manner of design and construction, in which the disadvantages known of the state of the art are avoided and in which during a roller bearing replacement, the danger of too high a temperature increase of the atmosphere within the housing, that can damage the electronic components of the roller bearing replacement device, is lowered.

In a roller bearing replacement device of the type mentioned at the start, the task is achieved according to the invention in the following way: the housing has a cooling chamber for cooling a roller bearing that has been demounted, whereby the at least one roller bearing handling device is designed and constructed so that it can be moved at least between a replacement position in which it can remove a roller bearing that is to be demounted, and a cooling position, in which it can position the demounted roller bearing in the cooling chamber.

Moreover, in a process of the type mentioned at the start, the task is solved according to the invention by moving the roller bearing that has been demounted from the roller hearth furnace by the roller bearing handling device to a cooling chamber formed within the housing and positioning it within the cooling chamber.

In the sense of the invention, under the term cooling chamber refers to a space or chamber that is essentially enclosed, however, it is enclosed or surrounded by at least five side walls. Consequently the cooling chamber is to be regarded as an enclosed subarea that is arranged and formed within the housing.

Advantageous and purposeful embodiments and further advantageous modifications of the invention are the subject matter of the sub claims.

Through the invention, a possibility is made available in a simple manner, through which the housing atmosphere can be held at a moderate temperature, in order to prevent damage to the electronic components installed. By being able to position the demounted roller bearing in the cooling chamber within the housing, a conscious arrangement of the roller bearing within the housing is affected. The cooling chamber can for example be arranged at a certain distance from the installed electronic components, so that the heat radiation of the roller bearing that has been demounted has no destructive effect on the electronic components. In addition or alternatively it is conceivable, that the cooling chamber has insulated walls, so that the heat radiation of the roller bearing that has been demounted has effect only within the cooling chamber. However according to another alternative, the cooling chamber can also be actively cooled, for example by blowing cool air into the cooling chamber by means of a blower.

Accordingly the invention provides for in an advantageous design or embodiment of the roller bearing replacement device, that the cooling chamber has at least one fluid-cooled cooling wall or plate. An active cooling of the hot roller bearing that was demounted from the roller bearing furnace can be realized through this.

Thereby in the design and construction of the process according to the invention it is advantageous, if at least one wall of the cooling chamber is cooled with cooled water. For this the cooled water is made available by a cooling water circuit that is not connected with the furnace cooling system, but is rather installed independently of it at the roller bearing replacement device and is connected with the walls to be cooled via a pipeline.

Instead of an active cooling of the roller bearing that has been demounted by means of at least one fluid-cooled, especially water-cooled wall of the cooling chamber, the walls can also be thermally insulated, in order to protect the inside of the housing, for example the electronic components installed as well as mechanical components, from the heat radiation of the hot roller bearing.

Since the overall size of the roller bearing replacement device is subject to certain limits and is not permitted to be chosen to be arbitrarily big or as big as desired, the size of the inside space of the roller bearing replacement device is limited to a minimum, so that efficient and ingenious arrangement of the individual components within the housing remains of paramount significance. Accordingly in the embodiment of the roller bearing replacement device according to the invention it is provided for, that at least one wall of the cooling chamber within the housing is constructed so that it can be moved or tilted. On account of this special design and construction of at least one wall of the cooling chamber, the positioning of a hot demounted roller bearing in the cooling chamber is possible without much trouble. Either the moveable wall moves to a position in which it does not stand in the way of the roller bearing handling device with the demounted roller bearing, or the wall of the chamber that can be tilted is designed and constructed in such a way that it can swivel like a door, so that a hot roller bearing can be inserted into the cooling chamber and positioned therein.

An especially efficient manner of designing the inside space of the housing and the cooling chamber is part of the embodiment of the roller bearing replacement device according to the invention as follows: at least one wall of the cooling chamber is coupled in a moveable manner with the at least one roller bearing handling device and can be moved together with it at least between the replacement position and the cooling position.

For the movement of the roller bearing replacement device inside the housing, the invention provides in an embodiment of the roller bearing replacement device that at least one roller bearing handling device is placed in a moveable manner on a crossbeam and can be moved alongside the length of the crossbeam in the direction of the sluice and away from the sluice. Thus the roller bearing handling device can be transported for demounting a roller bearing from the roller hearth furnace to the sluice in order to grip the roller bearing that is to be demounted, and subsequently back again alongside the crossbeam away from the sluice, in order to pull or to move the roller bearing out of the roller hearth furnace through the sluice into the housing. In this, such a crossbeam represents in terms of design and construction a simple and cost-effective solution to realize an appropriate movement of the roller bearing replacement device.

In order that the roller bearing replacement device can also be moved parallel to the roller hearth furnace inside the housing, so that the demounting of an old roller bearing and the installation of a new one can be carried out without the housing needing to be moved or opened for this, in order to position a demounted roller bearing in a manner in which it does not come in the way of installing a new one, it is provided for in the roller bearing replacement device according to the invention that the crossbeam bearing of at least one roller bearing handling device can be moved alongside the length on a position change beam, in which the position change beam is affixed to the housing and extends to the sluice in such a way that the position change beam supports the crossbeam with the at least one roller bearing handling device so that it can be moved parallel to the sluice. In particular the position change beam extends vertically or perpendicularly with respect to the crossbeam.

With a view to having an efficient utilization of the inner space of the housing, the invention provides in further embodiments, that the crossbeam supporting the at least one roller bearing handling device is arranged outside the cooling chamber and/or below a floor cooling panel of the cooling chamber.

In order to have a quick roller bearing replacement in time, in a further embodiment of the roller bearing replacement device according to the invention, it is provided that a first roller bearing handling device for demounting and storage of the demounted roller bearing that is replaced and a second roller bearing handling device for storing a roller bearing that is to be installed and for installing the roller bearing that is to be installed are arranged inside the housing in a moveable manner, in which the first roller bearing handling device is designed to move between the replacement position and the cooling position, and in which the second roller bearing handling device is designed so that it can be moved between a waiting position and the replacement position. Consequently the inner space of the housing is divided into three different zones, in which solely the first roller bearing handling device can be moved into the cooling position and only the second roller bearing handling device can be moved into the waiting position. However, both roller bearing handling devices are designed and constructed so they can move into the replacement position. However they cannot be moved simultaneously or at the same time into the replacement position; rather they can move only after one another into the replacement position.

In further embodiments of the roller bearing replacement device the invention provides that a cooling system that cools the atmosphere of the housing is provided for that is arranged outside the housing and is affixed to the housing, in which the cooling system is designed and constructed so as to lead the cooled housing atmosphere back into the housing. Since the cooling system is arranged outside the housing, space is not unnecessarily claimed or used up inside the gas-tight housing, so that the housing needs to only have place or space for the essential components of the roller bearing replacement device. Additionally, because of the cooling system, the atmosphere does not have any destructive effect anymore on the electronic components installed on and in the housing.

Accordingly it is provided for in an embodiment of the process according to the invention, that the housing atmosphere is cooled to a temperature lower than 60° C. with the help of a cooling system. The furnace atmosphere that reaches the housing through the sluice definitely has a temperature of 800° C. or even 1000° C., so that the electronic components of the housing necessarily need to be protected by cooling the atmosphere of the housing.

In order to effectively hinder a dispersal of the hot atmosphere of the furnace, the invention provides for in an embodiment of the roller bearing replacement device, that the cooling system is designed and constructed so that it is channel shaped and a first channel end is connected via an opening with the inside of the housing and a second channel end is connected via an outlet that is aligned with the sluice with the inside of the housing. Consequently the outlet that is aligned with the sluice ensures that the hot furnace atmosphere is counteracted immediately upon its entry into the housing by the cold or cooled atmosphere of the housing that meets or comes up against it.

In order to be able to cool the housing atmosphere appropriately, it is especially advantageous, if a fan that sucks and circulates the housing atmosphere is arranged within the cooling system and/or a heat exchanger which cools the atmosphere that is sucked in is arranged within the cooling system.

Furthermore in the embodiment of the roller bearing replacement device it is provided for, that at least one refrigeration unit is arranged outside of the housing supplying a cooling fluid at least for the cooling chamber. In this manner, a cooling circuit that is independent of the furnace cooling can be operated.

Finally in the design and embodiment of the process according to the invention it is provided for, that the roller bearing that is positioned inside the cooling chamber is rotated. The roller bearing that has been demounted, which is hot, thus remains in constant rotation, in order to provide an equal or even cooling and in order to avoid a damaging deformation or warping of the roller bearing that has been demounted.

The invention also focuses on an assembly for roller bearing replacement, that includes a roller bearing replacement device according to one of claims 1 to 12 and a roller bearing furnace, in which the roller bearing replacement device is arranged on a moveable platform that can be moved laterally alongside the roller hearth furnace, in which at least one refrigeration system is designed and constructed so as to move jointly with the moveable platform and makes available a cooling circuit that is moved with the moveable platform at least for the cooling chamber.

It shall be understood that the aforementioned and following characteristics shall be applicable or utilizable not only in the respectively mentioned combinations but also in other combinations or as unique characteristics, without departing from the framework of the present invention. The framework of the invention is only defined by the claims.

BRIEF DESCRIPTION OF THE DRAWINGS

Further details, characteristics and advantages of the object of the invention arise from the following description in conjunction with the drawing in which a preferred embodiment of the invention is depicted by way of example. In the drawing are shown.

DETAILED DESCRIPTION

Figure 1:
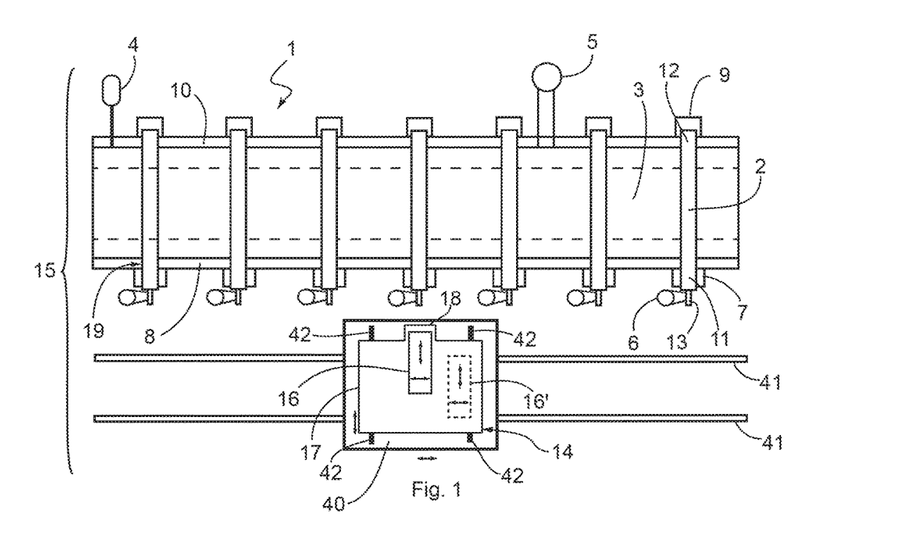
FIG. 1 is a schematic top view of a roller hearth furnace with a roller bearing replacement device according to the invention which is designed and constructed so as to be moveable laterally along the roller hearth furnace.

In FIG. 1, a schematic top view of a roller hearth furnace 1 is shown in which each of the roller bearings 2 are stored in a rotatable manner by means of a carrier roller bearing system. In the embodiment depicted in FIG. 1, the roller hearth furnace 1 is designed and constructed for continuous heat treatment of steel rolls 3. FIG. 1 is an exemplary depiction and shows only a section of the roller hearth furnace 1. For this sectional view the roller hearth furnace 1 has seven roller bearings 2, in which only one of the seven roller bearings 2 is provided with various reference signs for reasons of clarity. The roller hearth furnace 1 is hermetically sealed from its environment and is operated under a protective atmosphere. The roller bearings 2 are arranged alongside the longitudinal axis of the roller hearth furnace 1 and transport the steel roll 3, in which the process takes place at temperatures exceeding 1000° C. inside the roller hearth furnace 1. A heating unit 4 ensures maintenance of the temperature necessary for the process inside the roller hearth furnace 1, whereas a protective gas device 5 is responsible for regulating the desired protective gas atmosphere inside the roller hearth furnace 1. Each roller bearing 2 is connected outside the roller hearth furnace 1 with a drive unit 6, which drives the rotation of the respective roller bearing 2, in order to transport the steel band 3 through the roller hearth furnace 1. The bearing system of each of a roller bearing system of each roller bearing 2 not depicted in detail in the Figures includes a first bearing element 7 that is arranged on a first side wall 8 of the roller hearth furnace 1 and which must be detached from the first side wall 8 in case of a roller bearing exchange or replacement, and a second bearing element 9 which is placed on the second side wall 10 of the roller hearth furnace 1 that lies on the opposite side of the first side wall 8 and which must not be detached from the second side wall 10 in case of a roller bearing exchange but rather remains there for placement of the new roller bearing 2 that is to be inserted. In the bearing system each roller bearing 2 is placed so that it can rotate in the roller hearth furnace 1 with the first longitudinal end 11 by means of the first bearing element 7 and with the second longitudinal end 12 by means of the second bearing element 9, in which the first bearing element 7 and the second bearing element 9 are both fitted gas-tight with insulation plugs in such a manner that no protective gas can escape from the inside of the roller hearth furnace 1 during the operation of the furnace. From the first longitudinal end 11 of each roller bearing 2, a shaft journal 13 extends out which projects outwards from the respective first bearing element 7 and is connected for drive purposes with an associated drive unit 6, by which each of the roller bearings 2 is rotated during the operation of the roller hearth furnace 1. During a replacement of a roller bearing 2, firstly the drive unit 6 is detached from the shaft journal 13, before the roller bearing 2 that is to be demounted is removed from the roller hearth furnace 1 together with the first bearing element 7, whereas the second bearing element 9 remains in the roller hearth furnace 1 and pivots the roller bearing 2 that is to be installed.

As FIG. 1 further shows schematically, a roller bearing replacement device 14 is arranged laterally along the roller hearth furnace 1 for replacement of a roller bearing 2 of the roller hearth furnace 1, this device is moveable alongside the first side wall 8 of the roller hearth furnace 1 towards and away from the side wall 8 in order to be positioned before a roller bearing 2 that is to be demounted. The roller bearing replacement device 14 and the roller hearth furnace 1 constitute an assembly 15 (see for example FIG. 2), that is intended for replacement or exchange of a roller bearing 2. For roller bearing replacement, the first bearing element 7 is detached from the first side wall 8 and subsequently the roller bearing 2 that is to be replaced together with the first bearing element 7 is pulled out of the roller hearth furnace 1 with the help of a roller bearing handling device 16 of the roller bearing replacement device 14. In addition to the roller bearing handling device 16, the roller bearing replacement device 14 includes a housing 17 that can be sealed off from the environmental atmosphere, which has a sluice 18 that serves to couple with the roller hearth furnace 1 and through which access to a roller bearing 2 that is to be demounted from the housing 17 while excluding the atmosphere of the environment is possible. The roller bearing handling device 16 is placed moveably in the housing 17 in such a way that it can be moved towards and away from the side wall 8 as also laterally to the side wall 8, as described in detail below. Thus a single roller bearing handling device 16 can be used both for demounting a roller bearing 2 from the roller hearth furnace 1 as well as for installing a new roller bearing 2. It is also conceivable that a first roller bearing handling device 16 is used for demounting and subsequently moved away from the furnace and supports the demounted roller bearing 2, after which another roller bearing handling device 16' that is loaded with the roller bearing 2 that has to be installed is deployed for mounting and this is shown schematically in FIG. 1. Thus the two roller bearing replacement devices 16 and 16' can be moved inside the gas-tight housing 17, they can be positioned in front of the sluice 18 and furthermore can be at least partly moved out of the housing 17 through the sluice 18. Such a roller bearing replacement can thus take place with one or two roller bearing handling devices 16, 16', in which the roller hearth furnace 1 cooled down to 800° C. and is purged or flushed with nitrogen gas before the roller bearing replacement.

In order to keep the time required for roller bearing replacement as short as possible and hence minimize the down time, the roller bearing replacement is carried out laterally with respect to the roller hearth furnace 1, in which the operation of one or both roller bearing handling devices 16, 16' takes place shielded from the external environmental atmosphere.

Figure 2:
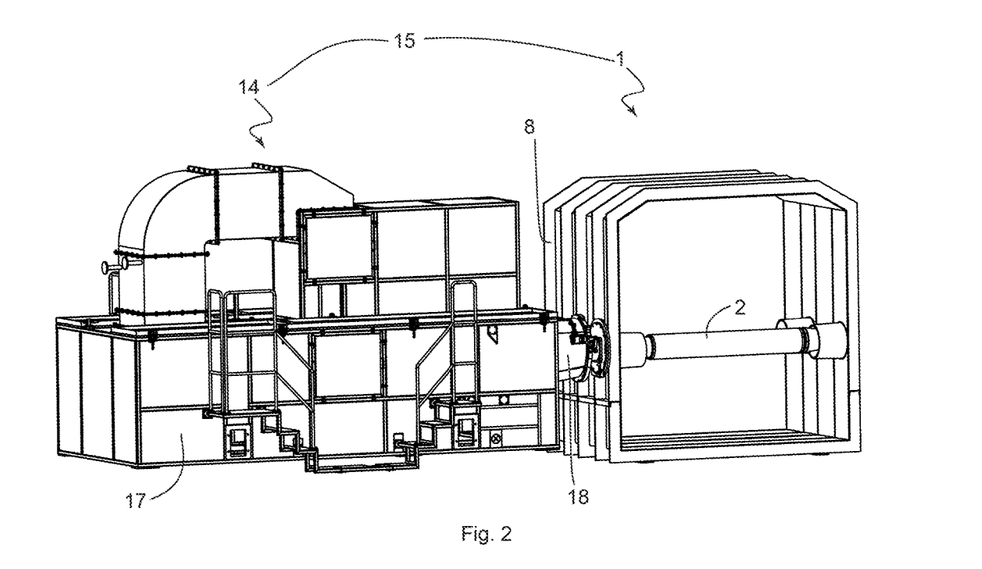
FIG. 2 is a perspective depiction of the roller bearing replacement device that is docked on to the roller hearth furnace.

Accordingly one or both roller bearing handling devices 16, 16' is or are operated in a housing 17 that is sealed off from the external environment and atmosphere. It is in such a housing 17 that is sealed off from the external atmosphere then that one or both roller bearing handling devices 16, 16' are arranged moveably and housed. Even in case of a roller bearing replacement with such a gas-tight housing 17 that is hermetically sealed from the external environment, the drive unit 6 is detached from the shaft journal 13 of the roller bearing 2 before the actual roller bearing change. Through the sluice 18, the housing 17 can be docked or coupled in a sealed manner with respect to the outer atmosphere or environment on to the roller hearth furnace 1, as shown in FIG. 2. In the process, the sluice 18 encloses the first bearing element 7, which is then removed out of the roller hearth furnace 1 together with the roller bearing 2 that is to be demounted. In other words, either the one or both of the roller bearing handling devices 16, 16' are arranged in a housing 17 that is sealed gas-tight from the outer environment and at least partially extendible out of this through the sluice 18 in a wall of the housing 17, in order to have access to the roller bearing 2 that is to be demounted. After the docking or coupling of the housing 17 on to the roller hearth furnace 1 as shown in FIG. 2, a protective gas atmosphere is introduced into the housing 17 itself which corresponds to the protective gas atmosphere of the inside of the roller hearth furnace 1. When accommodated within the housing 17, the roller bearing handling device 16 or both the roller bearing handling devices 16, 16' are designed and constructed so that they can be moved or tilted within the housing 17 in at least two spatial directions, as indicated by the arrow in FIG. 1. Additionally the housing 17 or the roller bearing replacement device 14 is constructed so as to move in at least one spatial direction in order to move up laterally at the roller bearing 2 that is to be replaced as shown by an arrow in FIG. 1. According to the embodiment shown, the roller bearing replacement device 14 is positioned on a moveable platform 40, which can be moved laterally alongside the roller hearth furnace 1 on rails 41. In order to dock on to the roller hearth furnace 1, the roller bearing replacement device 14 is furthermore placed on the moveable platform 40 that can be moved alongside on the rails 42, whereby the rails 42 enable a movement of the roller bearing replacement device 14 towards the roller hearth furnace 1 and away from it. Furthermore the one or both the roller bearing handling devices 16, 16' are designed and constructed as to be able to move in at least one spatial direction, in order to come near the first side wall 8 of the roller hearth furnace 1 for docking, which is also elucidated by an arrow. During roller bearing replacement, the roller bearing 2 that is to be replaced is pulled out of an opening 19 (see for example FIG. 1) from the first side wall 8 of the roller hearth furnace 1.

In FIG. 1 the roller bearing replacement device 14 is only shown schematically and exemplarily, wherein it is left open for the depiction shown therein, as to whether it uses one or two roller bearing handling devices 16, 16'. Both are possible, whereby a roller bearing replacement with only one single roller bearing handling device will take up more time. In FIGS. 3 to 11, to which reference is made below, an embodiment of the roller bearing replacement device 14 is shown, in which the two roller bearing handling devices 16, 16' are arranged so that they can be moved inside the housing 17. In this the first roller bearing handling device 16 serves to demount and store the demounted roller bearing 2 whereas a second roller bearing handling device 16' serves to store a roller bearing 2 that is to be installed as also to install it.

Figure 3:
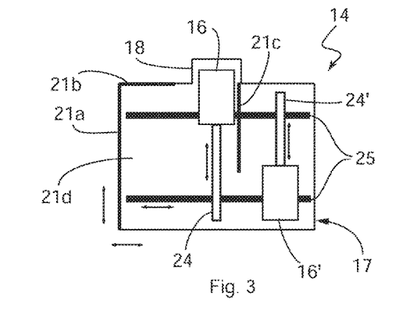
FIG. 3 is a schematic depiction of the roller bearing replacement device according to the invention in top view.
Figure 4:
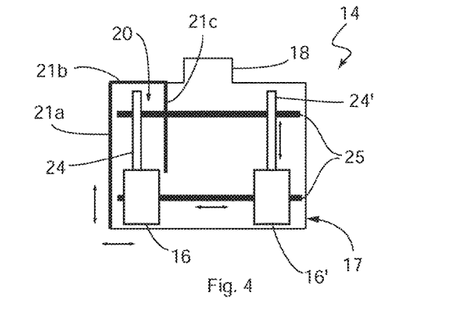
FIG. 4 is another schematic depiction of the roller bearing replacement device according to the invention in top view.
Figure 5:
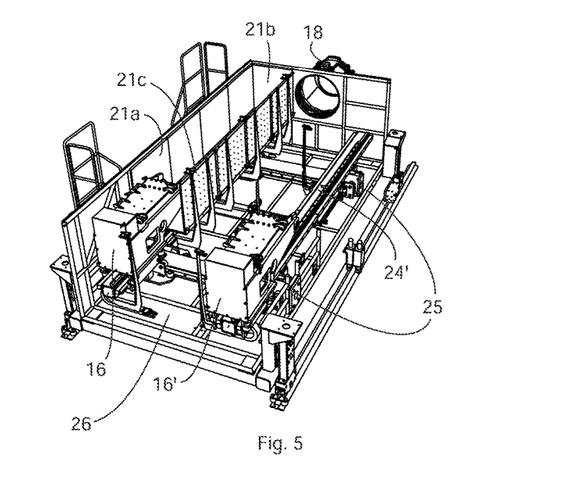
FIG. 5 is a perspective view of the roller bearing replacement device with the housing partly blanked off.
Figure 6:
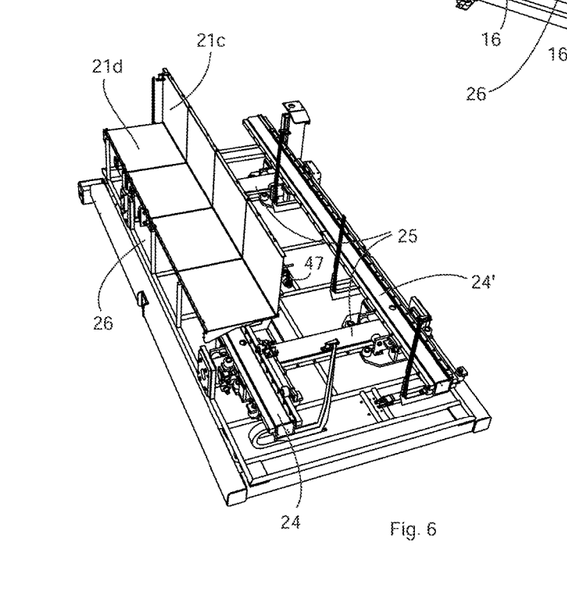
FIG. 6 is a perspective view of the roller bearing replacement device with the housing blanked off.
Figures 7, 8:
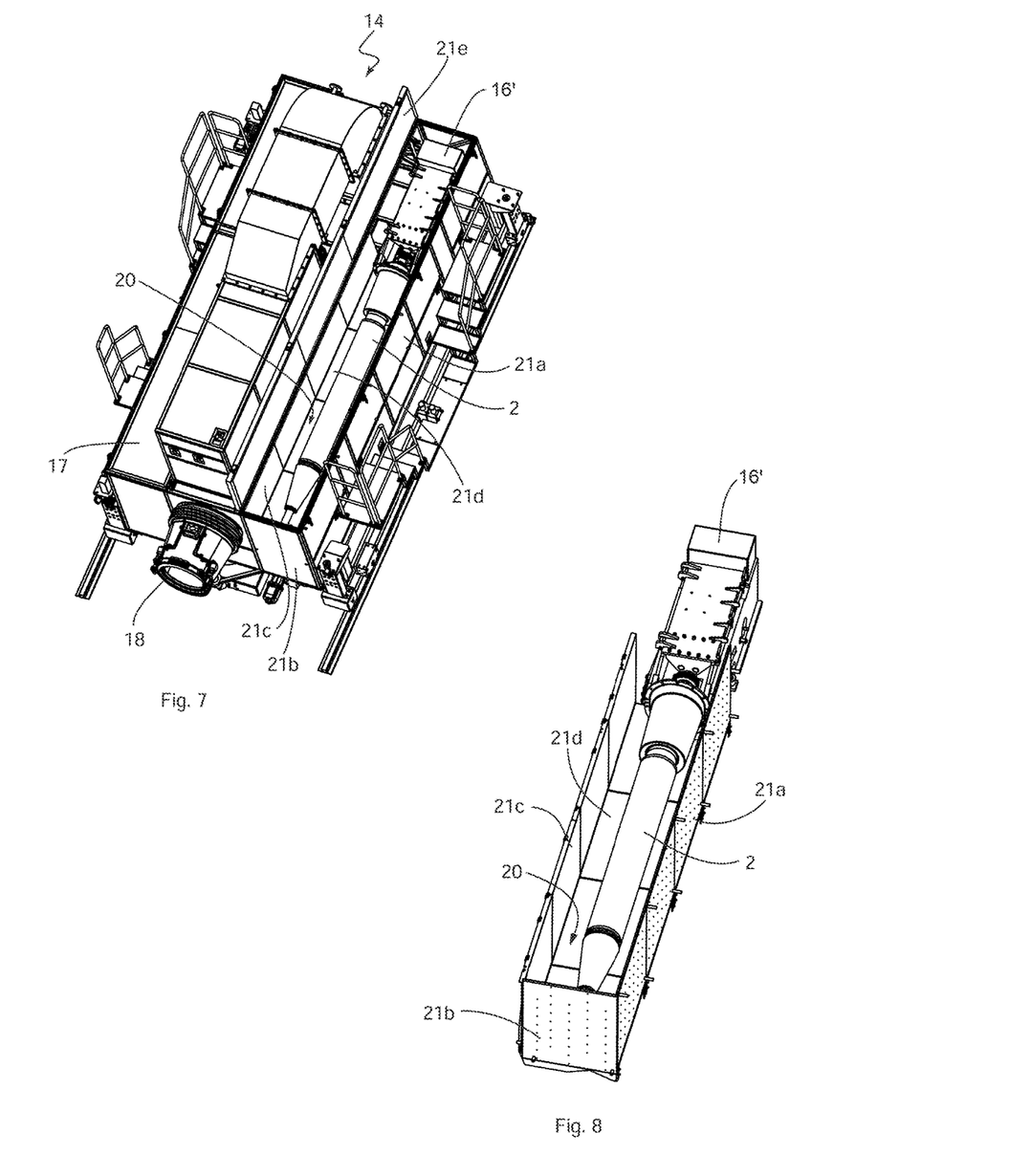
FIG. 7 is a perspective top view of the roller bearing replacement device after demounting a roller bearing.
FIG. 8 is a perspective detailed view of a roller bearing that has been demounted and which is positioned in a cooling chamber of the roller bearing replacement device.

In FIG. 3 the first roller bearing handling device 16 is arranged in a replacement position in which it is arranged in front of the sluice 18 and can pull the roller bearing 2 that is to be demounted from the roller hearth furnace 1 through the sluice 18, by moving the first roller bearing handling device 16 away from the sluice 18. For protecting the electronic components from the high heat radiation of the demounted roller bearing 2, the first roller bearing handling device 16 is moved to a cooling position, as shown in FIG. 4. The roller bearing 2 that is to be demounted is not shown for reasons of clarity in the FIGS. 3 to 6. In the cooling position, the first roller bearing handling device 16 positions the roller bearing 2 that has been demounted in a cooling chamber 20, as can be seen for example in FIGS. 7 and 8. The demounted roller bearing 2 is kept rotating inside the cooling chamber 20. In order to arrive at the cooling position, the first roller bearing handling device 16 is moved from the position shown in FIG. 3 within the housing 17 firstly away from the sluice 18 and subsequently laterally towards roller hearth furnace 1. In the cooling position, the roller bearing 2 that is demounted is surrounded by five cooling walls 21*a*, 21*b*, 21*c*, 21*d* and 21*e*, which form the cooling chamber 20. A sixth wall is omitted, since this position is taken up by the first roller bearing handling device 16 when it is arranged in the cooling position. The five cooling walls 21*a*, 21*b*, 21*c*, 21*d* and 21*e* are visible in FIG. 7, in which the cooling wall 21*e* is folded up in this representation in order to enable a view into the cooling chamber 20, in which the demounted roller bearing 2 is positioned. In the operation of the roller bearing replacement device 14, the cooling wall 21*e* is naturally folded down during roller bearing replacement and hermetically closes the cooling chamber 20 against the external environmental atmosphere. In FIG. 8 the top cooling wall 21*e* that is the ceiling cooling wall 21*e* is not depicted in order to show the first roller bearing handling device 16 in the cooling position with the roller bearing 2 that is arranged in the cooling chamber 20 in this position. While the first roller bearing handling device 16 is moved from the replacement position to the cooling position shown in FIG. 4 upon demounting, the second roller bearing replacement device 16' is shown in a waiting position in FIGS. 3 and 4. The second roller bearing handling device 16' is loaded with a new roller bearing 2, which is however not shown in the FIGS. 3, 4 and 5. When the first roller handling device 16 is arranged in the cooling position, the second roller bearing handling device 16' is moved into the replacement position for installing the new roller bearing 2, in which it then inserts the new roller bearing 2 through the sluice 18 into the roller hearth furnace 1. It shall be understood that prior to this, the first roller handling device 16 must be moved into the cooling position.

Figure 9:
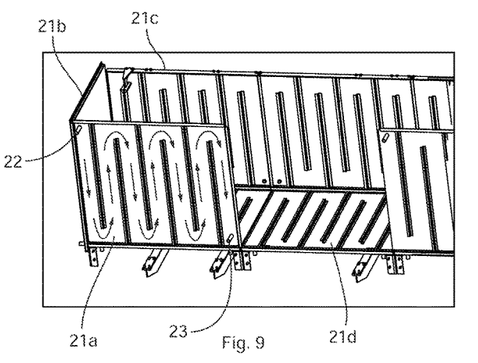
FIG. 9 is a perspective view of the cooling chamber.

For protecting the mechanical and electronic components of the roller bearing replacement device 14, the demounted roller bearing 2 is arranged in the cooling chamber 20, as shown in the FIGS. 7 and 8 and schematically elucidated in FIG. 4. Thereby the five walls 21*a*, 21*b*, 21*c*, 21*d* and 21*e* can be designed and constructed in a heat-insulating manner, so that the walls 21*a*, 21*b*, 21*c*, 21*d* and 21*e* ensure that the heat radiation from the demounted roller bearing 2 does not go out of the cooling chamber 20 does not radiate to the mechanical and electronic components outside the cooling chamber 20. The five walls 21*a*, 21*b*, 21*c*, 21*d* and 21*e* of the cooling chamber 20 in the embodiment shown in the figures are fluid-cooled walls. More exactly said, the walls 21*a*, 21*b*, 21*c*, 21*d* and 21*e* of the cooling chamber 20 are designed and constructed as water-cooled double walls, as is evident for example from FIG. 9. In this, each of the individual walls 21*a*, 21*b*, 21*c*, 21*d* or 21*e* include many wall elements. The individual walls are designed and constructed as side walls (21*a* and 21 *c*), front wall (21*b*), floor 'wall' (21*d*) and ceiling 'wall' (21*e*). As shown by FIG. 9, cooling water is brought in via a cooling water inlet connection 22 into a meandering cooling channel structure of the cooling walls 21*a*, in which the cooling water flows off via an outlet connection 23 from the cooling channel structure. While flowing through the meandering cooling channel structure of the cooling wall 21*a*, the cooling water takes up the heat radiated by the demounted roller bearing 2 and transports it away. In FIG. 9, the flow-through is depicted by arrows only for a single wall element of the cooling wall 21*a*, whereby it is evident that this cooling also takes place for the remaining wall elements of the cooling walls 21*b*, 21*c*, 21*d*, 21*e* in the manner described above. Water is used as the cooling fluid in each of the cooling walls 21*a*, 21*b*, 21*c*, 21*d* and 21*e*. Far more important for this embodiment of the invention is however the fact that water is used for the cooling of the cooling walls 21*a*, 21*b*, 21*c*, 21*d*, and 21*e*; this water is cooled down by a refrigeration unit which for example is arranged on the housing 17 of the roller bearing replacement device 14 or even upon a platform that can be moved laterally alongside the roller hearth furnace 1 with the roller bearing replacement device 14. This cooling circuit that is designed and constructed with at least one refrigeration unit and a piping system that is connected with the inside of the housing, is not connected with the furnace cooling water system. Rather this cooling circuit is arranged independently or in a self-contained manner on the roller bearing replacement device 14 outside the housing 17 and is connected by means of a piping system built of tubes with the walls 21*a*, 21*b*, 21*c*, 21*d* and 21*e* of the roller bearing replacement device 14 that are to be cooled.

In order that the hot roller bearings 2 can be positioned in the cooling chamber 20 after their demounting from the roller hearth furnace 1, access to the cooling chamber 20 must be possible. For this purpose the cooling wall 21*c*, that is a side wall of the cooling chamber 20, can be designed and constructed such that it can be tilted, so that when the first roller bearing handling device 16 moves from the replacement position into the cooling position, the cooling wall 21*c* can be moved out of the way of the roller bearing 2 that has been demounted like a door swinging out or swinging in. The embodiment depicted in the Figures has another possibility as well. In the embodiment shown in the Figures, the cooling wall 21*c* is not required to be moved out of the transport path since it is not arranged on it. Because the cooling wall 21*c* is coupled for movement with the first roller bearing handling device 16, so that the cooling wall 21*c* and the roller bearing handling device 16 can be moved together or jointly from the replacement position to the cooling position. This is shown schematically in the FIGS. 3 and 4. As FIG. 3 indicates, the first roller bearing handling device 16 is arranged between the cooling wall 21*c* and the remaining cooling walls 21*a* and 21*b*. Consequently the cooling chamber 20 is missing a side wall (namely the cooling wall 21*c*) when the first roller bearing handling device 16 is arranged in the replacement position. When however the roller bearing handling device 16 is moved in the cooling position (see for example FIG. 4), then the cooling wall 21*c* is moved along with it and borders the cooling chamber 20, in which the first roller bearing handling device 16 additionally ensures the bordering for the side opposite to the front wall 21*b*.

The manner in which the movement of the roller bearing handling device 16, 16' takes place and how it is linked to or associated with the cooling chamber 20, is described below. For the movement of the roller bearing handling devices 16, 16', a crossbeam 24, 24' is provided within the housing 17 for each roller bearing handling device 16, 16'. Each crossbeam 24, 24' extends in the direction of the sluice 18 so that the roller bearing handling devices 16, 16' can be moved or transported alongside on their own crossbeam 24, 24' towards the sluice 18 or away from it on the corresponding crossbeam 24, 24'. In this manner, a defective roller bearing 2 can be pulled out of the roller hearth furnace 1 by the first roller bearing handling device 16 or a new roller bearing 2 can be inserted into the roller hearth furnace 1 by the second roller bearing handling device 16', when the roller bearing handling devices 16, 16' are located in the replacement position, which (position) is characterized in that each of the roller bearing handling devices 16, 16' is positioned in front of the sluice 18, in which it can certainly take up a regressed or drawn-back position inside the housing. The replacement position, cooling position and waiting position are related to a condition or state of the roller bearing handling device 16, 16' in the longitudinal direction of the roller hearth furnace 1 and not to the distance of the roller bearing handling device 16, 16' from the opening 19 of the roller hearth furnace 1 or from the sluice 18. A position change of each roller bearing handling device 16, 16' is not possible with the help of the crossbeam 24, 24'.

In order that the roller bearing handling devices 16, 16' can take up the individual positions (replacement position, cooling position and waiting position) and change between these, the crossbeams 24, 24' must be arranged so that they are able to move inside the housing 18 and in the longitudinal direction of the roller hearth furnace 1. For this purpose a position support beam 25 has been provided, which in the embodiment here is made of two carrier elements. The position support beam 25 extends in the longitudinal direction of the roller hearth furnace 1 as well as perpendicular i.e. right-angled to the crossbeams 24, 24' and is affixed to the housing 17. In this way the two crossbeams 24, 24' are moveable together with the roller bearing handling devices 16, 16' arranged thereon alongside the position change beam 25, so that the first roller bearing handling device 16 can be moved between the replacement position and the cooling position and the second roller bearing handling device 16' can be moved between the waiting position and the replacement position. The position change beam 25 that is affixed firmly to the floor 26 of the housing 17 enables consequently a movement of the roller bearing handling devices 16, 16' crosswise or transverse to the sluice 18, by the crossbeams 24, 24' being moved alongside the length of the position change beam 25, for which purpose a traction device 47 (see for example FIG. 6) has been provided which arranges for the respective movement either of the cross beam 24 or of the crossbeam 24'.

In order that the demounted roller bearing 2 can be arranged to the greatest extent possible within the cooling chamber 20 and surrounded as completely as possible by cooling walls, the cooling wall that functions as the cooling floor 21d is arranged with a spacing to the floor 26 of the housing 17, so that at least the crossbeam 24 and the position change beam 25 are arranged between the floor 26 of the housing 17 and the cooling floor 21d of the cooling chamber 20. The cooling floor 21d extends in the horizontal direction viewed towards the roller hearth furnace 1 only up to the first roller bearing handling device 16, so that this device can be arranged in the cooling position, as can be seen in the FIGS. 3, 4 and 6. In the cooling position then the roller bearing handling device 16 forms a sixth wall of the cooling chamber 20 (see for example FIG. 5), so that the cooling chamber 20 is essentially enclosed or closed. In other words the crossbeam 24 which stores the roller bearing handling device 16 in a moveable or displaceable manner is arranged in the cooling position outside the cooling chamber 20 and below the cooling floor 21d of the cooling chamber 20.

Figure 10:
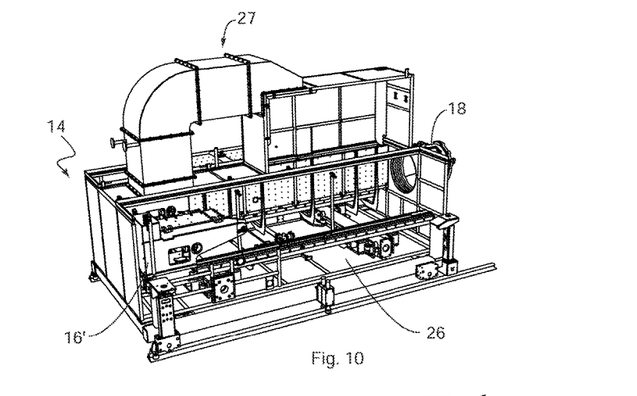
FIG. 10 is another perspective view of the roller bearing replacement device with the housing blanked off.
Figure 11:
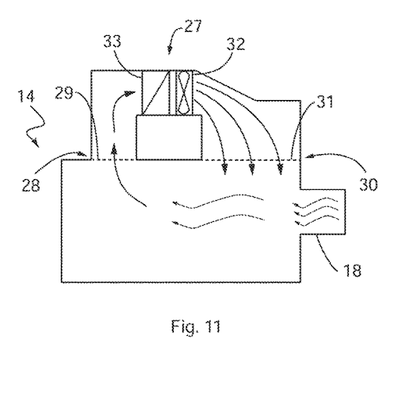
FIG. 11 is a systematic lateral sectional view of a cooling system of the roller bearing replacement device.

After the demounted roller bearing 2 is positioned in the cooling chamber 20, a part of the furnace atmosphere reaches the inside of the housing 17 through the sluice 18. The furnace atmosphere has a very high temperature of 800° C. for example, and this has a destructive effect on the electronic components installed. In order to counteract this effect, the housing atmosphere that gets mixed with the furnace atmosphere and thus gets heated up, is cooled by means of a cooling system 27, as can be seen in FIGS. 10 and 11. The cooling system 27 that cools the atmosphere of the housing is arranged outside the housing 17 and leads or conducts the cooled housing atmosphere continuously back into the housing 17. The cooling system 27 is channel shaped and is connected at a first channel end 28 through an opening 29 with the inside of the housing 17, in which the cooling system 27 is connected at a second channel end 30 with the inside of the housing 17 through an outlet 31 that is aligned with the sluice 18, in order to lead the cooled furnace atmosphere back into the inside of the housing 17. The cooling system 27 is arranged above the two roller bearing handling devices 16, 16' in the region of the ceiling or roof of the housing 17. Inside the cooling system 27 are arranged a fan 32 that sucks and circulates the atmosphere of the housing and a heat exchanger 33 that cools the atmosphere sucked from the housing, in which the fan 32 is arranged downstream of the heat exchanger 33, so that the fan 32 is flooded with atmospheric air that has been already cooled, which has an advantageous effect for its durability. With the help of the cooling system 27, the housing atmosphere is cooled down to a temperature lower than 60° C. so that there no danger for the electronic components exists.

Figure 12:
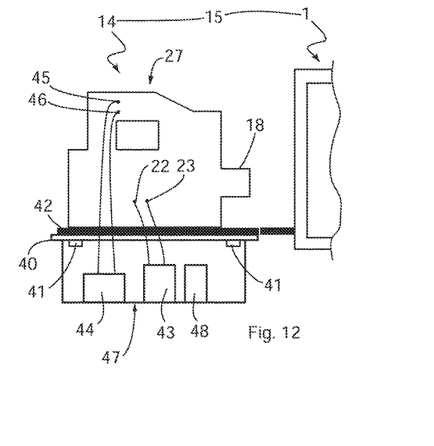
FIG. 12 is a lateral view of the assembly consisting of the roller hearth furnace and the roller bearing replacement device in schematic form.

FIG. 12 shows the assembly 1 which includes the roller hearth furnace 1 and the roller bearing replacement device 14 for replacement or exchange of roller bearing in a systematic side view. The rails 41 are shown in this depiction alongside which the moveable platform 40 can be moved laterally alongside the roller hearth furnace 1; the roller bearing replacement device 14 is placed on this platform. Likewise one of the two rails 42 is shown, upon which the roller bearing replacement device 14 can be moved towards the roller hearth furnace 1 and away from it, in which the rails 41 are mounted on the moveable platform 40.

Furthermore the cooling circuit for the cooling walls 21a, 21b, 21c, 21d and 21e is shown in FIG. 12; this cooling system is formed by a first refrigeration unit 43 and a first piping system 44. Thus cooling water is made available from the first refrigeration unit 43 and led through a feed pipe to the cold water inlet connection 22, from where the cooling water is then distributed to the cooling walls 21a to 21e and then flows through these. After flowing through the cool walls 21a to 21e, the cooling water which has been warmed up while flowing through the cooling walls 21a to 21e, is led back through the cooling water outlet connection 23 to the first refrigeration unit 43 where the cooling water is cooled down before it is again fed to the cooling water inlet connection 22.

Finally a cooling circuit for the heat exchanger 33 is shown in FIG. 12 that has a second refrigeration unit 44, which provides cooled cooling fluid to the heat exchanger 33 in order to cool down the atmosphere inside the housing 17 to a maximum of 60° C. In this the cooling fluid is fed via a cooling fluid inlet connection 45 to the heat exchanger 33 and via a cooling fluid outlet connection 46 back to the second refrigeration unit 44, where the cooling fluid that has been warmed up is cooled down with the help of the second refrigeration unit 44 and subsequently led back to the heat exchanger 33.

In the assembly 15 in FIG. 12, both the refrigeration units 43 and 44 are positioned on a platform 47 that is arranged in a suspended manner below the moveable platform 40 on which platform 47 are arranged in addition at least an electrical cabinet 48 for the control and/or signal processing.

Both the refrigeration units 43, 44 can be moved on the side of the roller hearth furnace 1 together with the moveable platform 40. However the refrigeration units 43, 44 are not moved towards the roller hearth furnace 1 and away from it, since the suspended platform 47 does not permit such a movement. Hence the pipelines to the respective inlet connections 22, 45 and the respective outlet connections 23, 46 are constructed so as to be flexible in their length and/or have sufficient length so that the pipeline connections to these connections are retained and ensured during the movement of the roller bearing replacement device 14 on the moveable platform 40 relative to the platform 47. Instead of two refrigeration units 43, 44 that instead of being positioned below can also be positioned above or on the side of the roller bearing replacement device 14, a single refrigeration unit can be provided to supply cold water to the heat exchanger 33 and the cooling walls 21a to 21e, as long as it is ensured that one refrigeration unit can maintain a cooling circuit sufficiently. This cooling circuit enables a self-sufficient operation of the roller bearing replacement device 14 without needing a flexible water piping connection with the roller bearing replacement device 14 that can be moved sideways along the roller hearth furnace 1 needing to be made available. In summary, a roller bearing replacement device 14 according to the invention for replacement or exchange of a roller bearing 2 of a roller bearing furnace 1 is described hereinabove. In this, the roller bearing replacement device 14 has a housing 17 that can be sealed off against the external atmosphere, which includes a sluice 18 that can be coupled on the roller hearth furnace 1 and through which access to a roller bearing 2, of the roller hearth surface 1, that is to be demounted is possible from inside the housing 17 while excluding the external atmosphere. Furthermore, there is at least one roller bearing handling device 16, 16' intended for demounting and installing roller bearings 2 that is arranged so that it can be moved within the housing 17 and is constructed so that it can be at least partly moved out of the housing 17 through the sluice 18. The housing 17 has a cooling chamber 20 that is designed and constructed for cooling down a roller bearing 2 that has been demounted, in which the at least one roller bearing handling device 16 is constructed so that it can move at least between a replacement position, in which it can remove the roller bearing 2 from the roller hearth furnace 1 through the sluice 18, and a cooling position, in which it positions the roller bearing 2 that has been demounted in the cooling chamber 20.

Finally using the roller bearing replacement device 14 described hereinabove, the process according to the invention can be implemented for replacement or exchange of roller bearings 2 of a roller hearth furnace 1, in which the roller bearing replacement device 14 is moved laterally near the roller hearth furnace 1 to the position of the roller bearing 2 that is to be replaced, the roller bearing 2 is detached from the drive unit 6 and then the roller bearing replacement device 14 is moved to the roller hearth furnace 1 to the roller bearing 2 that is to be replaced, in which a sluice 18 of the roller bearing replacement device 14 is coupled in a gas-tight manner on the roller hearth furnace 1, and in which then the roller bearing 2 that is to be demounted is moved out the roller hearth furnace 1 into the housing 17 via the sluice 18 by means of the roller bearing handling device 16 that can be moved within the housing 17. According to the invention, the roller bearing 2 that has been demounted from the roller hearth furnace 1 by the roller bearing handling device 16 is moved to a cooling chamber 20 that is constructed inside the housing 17 and is positioned in the cooling chamber 20.

The invention described above is naturally not limited to the embodiment described and depicted. It is obvious that in the embodiment depicted in the drawing numerous manifest or self-evident alterations or modifications can be undertaken according to the intended usage by the specialist, without thereby egressing from the realm of the invention. For example in the embodiment according to the FIGS. 3 to 11, even only one single roller handling device 16 can be used, so that only one crossbeam needs to be provided, by means of which device a roller bearing replacement or exchange would be possible to carry out as before, but would however require more time. Naturally in case of a single roller bearing handling device 16, an appropriate device must be provided within the housing 17, on which the roller hearing handling device 16 can place the demounted roller bearing, and also have another device which can store the roller bearing that is to be installed. With the aid of such auxiliary or additional devices, the roller bearing handling device 16 could then move inside the housing and according to the working step, place the demounted roller bearing and take up a new roller bearing for installation. It is also not necessary to have two refrigeration systems 43, 44 and two cooling circuits for cooling the atmosphere of the housing and the cooling walls, but even one single refrigeration system that is appropriately designed and dimensioned can be provided which makes available cooled fluid to the cooling walls 21a to 21e as well as to the heat exchanger 33. To the invention belongs all that which is contained in the description and/or depicted in the drawing, including that which deviates from the concrete embodiment and is self-evident or manifest for the specialist.

The invention claimed is:

1. A roller bearing replacement device for replacement or exchange of a roller bearing of a roller hearth furnace comprising:
   a housing that can be sealed off from the external environment or atmosphere, which has a sluice that can be coupled to the roller hearth furnace, through which access to a roller bearing of the roller hearth furnace that is to be demounted while excluding the external atmosphere from the inside of the housing, and
   at least one roller bearing handling device that is designed and constructed for demounting and installing of roller bearings, which is placed moveably in the housing and which can be moved out at least partly of the housing through the sluice, wherein
   the housing has a cooling chamber designed for cooling of demounted roller bearings in which the at least one roller bearing handling device is constructed so that it can be moved at least between a replacement position, in which it can remove the roller bearing that is to be demounted from the roller hearth furnace through the sluice, and a cooling position, in which it positions the demounted roller bearing in the cooling chamber.

2. The roller bearing replacement device according to claim 1, wherein the cooling chamber has at least one fluid-cooled wall.

3. The roller bearing replacement device according to claim 1, wherein at least one wall of the cooling chamber is designed so that it can be either moved inside the housing and/or tilted.

4. The roller bearing replacement device according to claim 1, wherein at least one wall of the cooling chamber is coupled in a moveable manner with the at least one roller bearing handling device and can be moved together with the device at least between the replacement position and the cooling position.

5. The roller bearing replacement device according to claim 1, wherein the at least one roller bearing handling device is placed in a moveable manner on a crossbeam and can be moved alongside the length of the crossbeam towards the direction of the sluice and away from it.

6. The roller bearing replacement device according to claim 5, wherein the crossbeam bearing the at least one roller bearing handling device is placed so that it can be moved along the length of a position change beam, in which the position change beam is affixed to the housing and extends towards the sluice in such a way that the position change beam holds the crossbeam so that it can be moved with the at least one roller bearing handling device parallel towards the sluice.

7. The roller bearing replacement device according to claim 5, wherein the crossbeam bearing the at least one roller bearing replacement device is arranged in the cooling position outside the cooling chamber and/or below a cooling floor of the cooling chamber.

8. The roller bearing replacement device according to claim 1, wherein a first roller bearing handling device meant for demounting and storing the demounted roller bearing and a second roller bearing handling device meant for storing a roller bearing that is to be installed and for installing the roller bearing that is to be installed are arranged in a moveable manner inside the housing, in which the first roller bearing handling device is constructed so as to be able to move between the replacement position and the cooling position, and in which the second roller bearing handling device is constructed so as to be able to move between a waiting position and the replacement position.

9. The roller bearing replacement device according to claim 1, wherein a cooling system which cools down the atmosphere of the housing is provided; this cooling system is arranged outside the housing and is affixed to it, in which the cooling system is designed and constructed so that it leads the cooled housing atmosphere back into the housing.

10. The roller bearing replacement device according to claim 9, wherein the cooling system is designed in the form of channels and is connected with a first channel end through an opening with the inside of the housing and at a second channel end via an outlet that is aligned with the sluice with the inside of the housing.

11. The roller bearing replacement device according to claim 9, wherein within the cooling system are organized a fan that sucks and circulates the housing atmosphere and/or a heat exchanger which cools the sucked atmosphere.

12. The roller bearing replacement device according to the claim 1, wherein that, that at least one refrigeration unit is arranged outside the housing which makes cooling fluid available at least for the cooling chamber.

13. An assembly for replacement of a roller bearing of a roller hearth furnace comprising a roller bearing replacement device according to claim 1 and a roller hearth furnace, in which the roller bearing replacement device is arranged on a moveable platform that can move on the side of the roller hearth furnace, in which at least one refrigeration unit is constructed so as to be able to move together with the moveable platform and provides a cooling circuit that moves along with the moveable platform at least for the cooling chamber.

* * * * *